United States Patent
Matsuda

(10) Patent No.: US 10,104,702 B2
(45) Date of Patent: Oct. 16, 2018

(54) COMMUNICATION APPARATUS, CONTROL METHOD THEREOF AND STORAGE MEDIUM

(71) Applicant: CANON KABUSHIKI KAISHA, Tokyo (JP)

(72) Inventor: Jun Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 15/259,190

(22) Filed: Sep. 8, 2016

(65) Prior Publication Data

US 2017/0094703 A1  Mar. 30, 2017

(30) Foreign Application Priority Data

Sep. 24, 2015  (JP) ................. 2015-187435

(51) Int. Cl.
*H04W 88/06* (2009.01)
*H04W 76/02* (2009.01)
*H04N 19/40* (2014.01)
*H04M 1/725* (2006.01)
*H04N 1/00* (2006.01)
*H04N 7/18* (2006.01)
*H04W 76/14* (2018.01)
*H04W 84/12* (2009.01)

(52) U.S. Cl.
CPC ....... *H04W 76/023* (2013.01); *H04M 1/7253* (2013.01); *H04N 1/00106* (2013.01); *H04N 1/00307* (2013.01); *H04N 7/183* (2013.01); *H04N 19/40* (2014.11); *H04W 76/14* (2018.02); *H04W 84/12* (2013.01)

(58) Field of Classification Search
CPC .................................................. H04W 88/06
See application file for complete search history.

(56) References Cited

U.S. PATENT DOCUMENTS

| 2010/0005520 A1* | 1/2010 | Abbot ............. G06Q 10/10 726/6 |
| 2010/0214420 A1 | 8/2010 | Yoshida ............ 348/207.1 |

(Continued)

FOREIGN PATENT DOCUMENTS

JP  2009-152689  7/2009

*Primary Examiner* — Charles Appiah
*Assistant Examiner* — Frank Donado
(74) *Attorney, Agent, or Firm* — Fitzpatrick, Cella, Harper & Scinto

(57) ABSTRACT

A communication apparatus capable of communicating with an external device via a wireless network, comprises: a transmission unit configured to transmit relevant information regarding data to be transmitted to the external device, before connecting to the wireless network; a reception unit configured to receive a response to the relevant information transmitted; a connection unit configured to connect to the wireless network, in a case where the response is received; a data communication unit configured to establish communication and transmit the data, after the connection unit has connected to the wireless network; a conversion unit configured to convert data; and a specification unit configured to specify relevant information regarding data to be converted, wherein in a case of converting the data to be transmitted, the transmission unit transmits relevant information regarding the data to be converted.

13 Claims, 7 Drawing Sheets

(56) References Cited

U.S. PATENT DOCUMENTS

| | | | | |
|---|---|---|---|---|
| 2014/0211025 A1* | 7/2014 | Hiramatsu | ......... | H04N 1/00307 348/207.1 |
| 2014/0359140 A1* | 12/2014 | Shankarraman | .... | H04L 65/1069 709/227 |
| 2016/0294839 A1* | 10/2016 | Walline | ................. | H04L 63/105 |

* cited by examiner

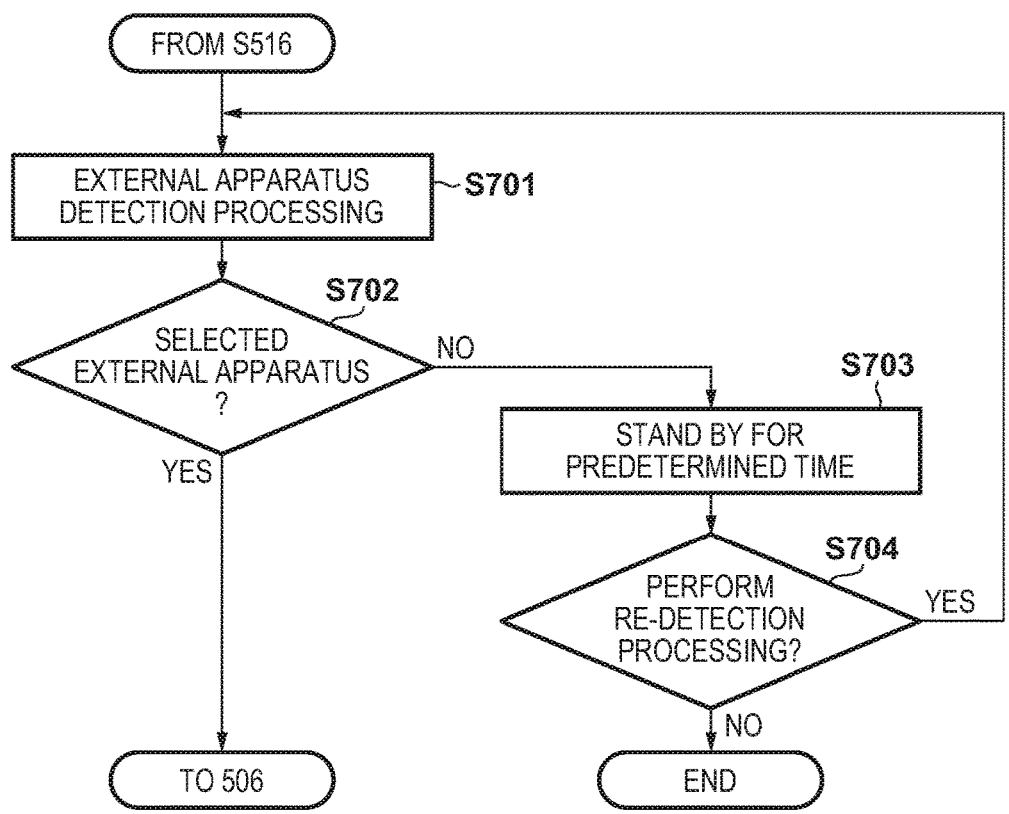

COMMUNICATION APPARATUS, CONTROL METHOD THEREOF AND STORAGE MEDIUM

BACKGROUND OF THE INVENTION

Field of the Invention

The present invention relates to a communication apparatus that communicates with an external device, a control method thereof, and a storage medium.

Description of the Related Art

Following the widespread use of wireless communication, providing a wireless communication function in a mobile terminal such as a digital camera, and transmitting data such as video files to an external device has been proposed (Japanese Patent Laid-Open No. 2009-152689). For example, in the case of transmitting data to an external device using a wireless LAN, a mobile terminal first executes processing for participating in the wireless LAN network to which the external device belongs, and then executes processing for establishing communication with the external device.

However, if the external device cannot receive data due to factors such as the capacity of the external device after executing the processing for participating in the wireless LAN network and the processing for establishing communication with the external device, the communication processing that was performed will have been wasted. Furthermore, in the case of converting (transcoding) the format of data such as video files and transmitting the data to the external device, communication processing and conversion processing that require large electrical power consumption are performed, and therefore, if the external device cannot receive data after this processing, the wastefulness of the processing becomes more notable. Therefore, from a viewpoint of avoiding wasteful processing and efficiently using computation resources, there is a desire to appropriately perform conversion processing on data to be transmitted to an external device and processing for communicating with the external device.

SUMMARY OF THE INVENTION

The present invention has been made in consideration of the aforementioned problems, and realizes a technique that makes it possible to avoid wasteful communication processing in the case of performing transcoding processing and transferring data to an external device.

In order to solve the aforementioned problems, one aspect of the present invention provides a communication apparatus capable of communicating with an external device via a wireless network, comprising: a transmission unit configured to transmit, to the external device, relevant information regarding data to be transmitted to the external device, before connecting to the wireless network; a reception unit configured to receive, from the external device, a response to the relevant information transmitted by the transmission unit; a connection unit configured to connect to the wireless network, in a case where the response is received by the reception unit; a data communication unit configured to establish communication with the external device and transmit the data, after the connection unit has connected to the wireless network; a conversion unit configured to convert data; and a specification unit configured to specify relevant information regarding data to be converted by the conversion unit, wherein in a case of converting the data to be transmitted to the external device, the transmission unit transmits relevant information regarding the data to be converted that was specified as the relevant information by the specification unit.

Another aspect of the present invention provides, a control method of a communication apparatus capable of communicating with an external device via a wireless network, the method comprising: transmitting, to the external device, relevant information regarding data to be transmitted to the external device, before connecting to the wireless network; receiving, from the external device, a response to the transmitted relevant information; connecting to the wireless network, in a case where the response is received; establishing communication with the external device and transmitting the data, after connecting to the wireless network; converting data; and specifying relevant information regarding data to be converted, wherein in a case of converting the data to be transmitted to the external device, relevant information regarding the data to be converted that was specified as the relevant information in the specifying is transmitted.

Still another aspect of the present invention provides, a non-transitory computer-readable storage medium storing a program for causing a computer to execute a control method of a communication apparatus capable of communicating with an external device via a wireless network, the program including codes for: transmitting, to the external device, relevant information regarding data to be transmitted to the external device, before connecting to the wireless network; receiving, from the external device, a response to the relevant information transmitted by the transmitting code; connecting to the wireless network, in a case where the response is received by the receiving code; establishing communication with the external device and transmitting the data, after connecting to the wireless network by the connecting code; converting data; and specifying relevant information regarding data to be converted by the converting code, wherein in a case of converting the data to be transmitted to the external device, relevant information regarding the data to be converted that was specified as the relevant information by the specifying code is transmitted by the transmitting code.

According to the present invention, it becomes possible to avoid wasteful communication processing in the case of performing transcoding processing and transferring data to an external device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a flowchart showing operations of data transfer processing according to a second embodiment.

DESCRIPTION OF THE EMBODIMENTS

First Embodiment

Exemplary embodiments of the present invention will be described below in detail with reference to the drawings. Note that an example will be described below in which the present invention is applied to an arbitrary digital camera that can transmit/receive data by performing communication, as an example of a communication apparatus. However, the present invention is not limited to a digital camera, and can also be applied to any electronic devices that can transmit/receive data by performing communication. These devices may include mobile phones, gaming devices, tablet terminals, personal computers, watch-type and glasses-type information terminals, for example. Moreover, description will be given below regarding any mobile phone that can transmit/receipt data to/from a digital camera, as an example of an external device, but the present invention can also be applied to any of the above electronic devices that can transmit/receive data by performing communication.

Furthermore, in this embodiment, an example will be described in which a wireless LAN system conforming to the IEEE 802.11 series of standards is used, but the communication mode is not necessarily limited to a wireless LAN conforming to IEEE 802.11, and other schemes may be used. Specifically, other wireless communication schemes such as a wireless USB, MBOA, Bluetooth (registered trademark), UWB and ZigBee (registered trademark) may be used. Also, communication may be carried out in a wired communication medium such as a wired LAN. Note that MBOA is an abbreviation for Multi Band OFDM Alliance. Also, UWB includes wireless USB, wireless 1394, WINET and the like.

Configuration of Digital Camera 100

Figure 1:
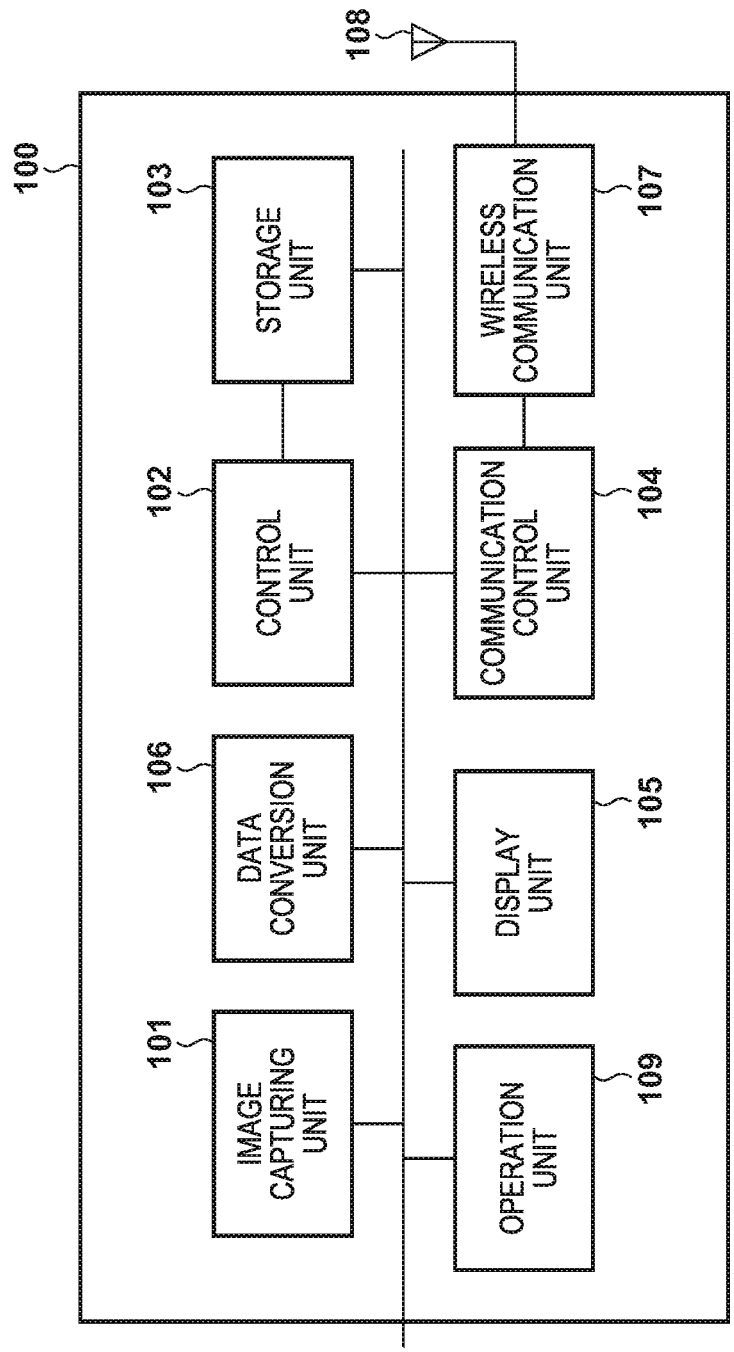
FIG. 1 is a block diagram showing an example of a functional configuration of a digital camera as an example of a communication apparatus according to embodiments of the present invention.

FIG. 1 is a block diagram showing an example of the functional configuration of a digital camera 100 as an example of the communication apparatus of this embodiment. Note that one or more of the functional blocks shown in FIG. 1 may be realized by hardware such as an ASIC or a programmable logic array (PLA), or may be realized by a programmable processor such as a CPU or an MPU executing software. Such functional blocks may also be realized by a combination of software and hardware. Therefore, even in a case where different functional blocks are described as performing certain operations in the following description, it is possible that those operations are realized by the same hardware.

An image capturing unit 101 includes an imaging optical system, an image sensor, a digital image processing unit and the like, an object optical image formed on the image sensor is photoelectrically converted by the imaging optical system so as to generate analog signals, and the analog signals are further converted into digital data by the image processing unit so as to generates image data. In the case of handling image data that is a moving image (also referred to as moving image data), for example, image data in which one frame is constituted by 1920 horizontal pixels×1080 vertical pixels can be output at a predetermined frame rate (for example, 30 frames per second). Such output from the image capturing unit 101 is transmitted via a bus, and is stored in a storage unit 103.

A control unit 102 includes a CPU or an MPU, for example, and controls the entirety of the digital camera 100 by expanding a control program stored in a ROM included in the storage unit 103 in a work area of a RAM included in the storage unit 103 and executing the control program. The control unit 102 also controls processing such as setting of communication parameters for communication with an external device on a network, participation in the network, and establishment of communication with the external device, and data transfer processing to be described later.

The storage unit 103 includes various memories such as a ROM, a RAM, an HDD and a flash memory, and stores a control program that is executed by the control unit 102 and various types of information such as communication parameters. The storage unit 103 also stores moving image data and still image data shot by the digital camera 100, and temporarily stores data obtained by transcoding such data.

A communication control unit 104 includes a control circuit or a function module for performing wireless communication, and performs transmission/reception of data to be transferred such as control information and moving image data by performing wireless LAN communication conforming to the IEEE 802.11 series of standards, for example, in accordance with instructions from the control unit 102.

For example, a display unit 105 includes a monitor constituted by an LCD or LED panel, which may be a panel further including a touch panel-type input element. The display unit 105 can perform at least one of output of visually recognizable information such as moving image data stored in the storage unit 103 and an operation screen (menu screen) for the operations of the digital camera 100, and sound output such as that from a speaker or the like.

A data conversion unit 106 (data conversion means) includes a processing circuit or a functional block, converts (transcodes) image files (moving image data and still image data files) stored in the storage unit 103 into files in a different data format, and outputs the files to the storage unit 103 or the communication control unit 104. For example, mutual conversion of moving image data between an MPEG format and an MOV format, mutual conversion of still image data between a JPEG format and a PNG format, and processing for changing the number of pixels or the resolution of moving image data and still image data are included. For example, the data conversion unit 106 may be constituted by dedicated hardware called a transcoder, or the control unit 102 may be substituted for the functions of the data conversion unit 106.

A wireless communication unit 107 includes a control circuit or a control module for controlling an antenna 108 and performing wireless communication, and controls signal output and the like for performing wireless communication.

An operation unit 109 includes various buttons, a touch panel and the like, and the user operates the digital camera 100 by performing various types of input and the like via the various buttons and menu screens. The operation unit 109 transmits detected user input to the control unit 102.

Configuration of Function Block Related to Communication Control Function

Figure 2:
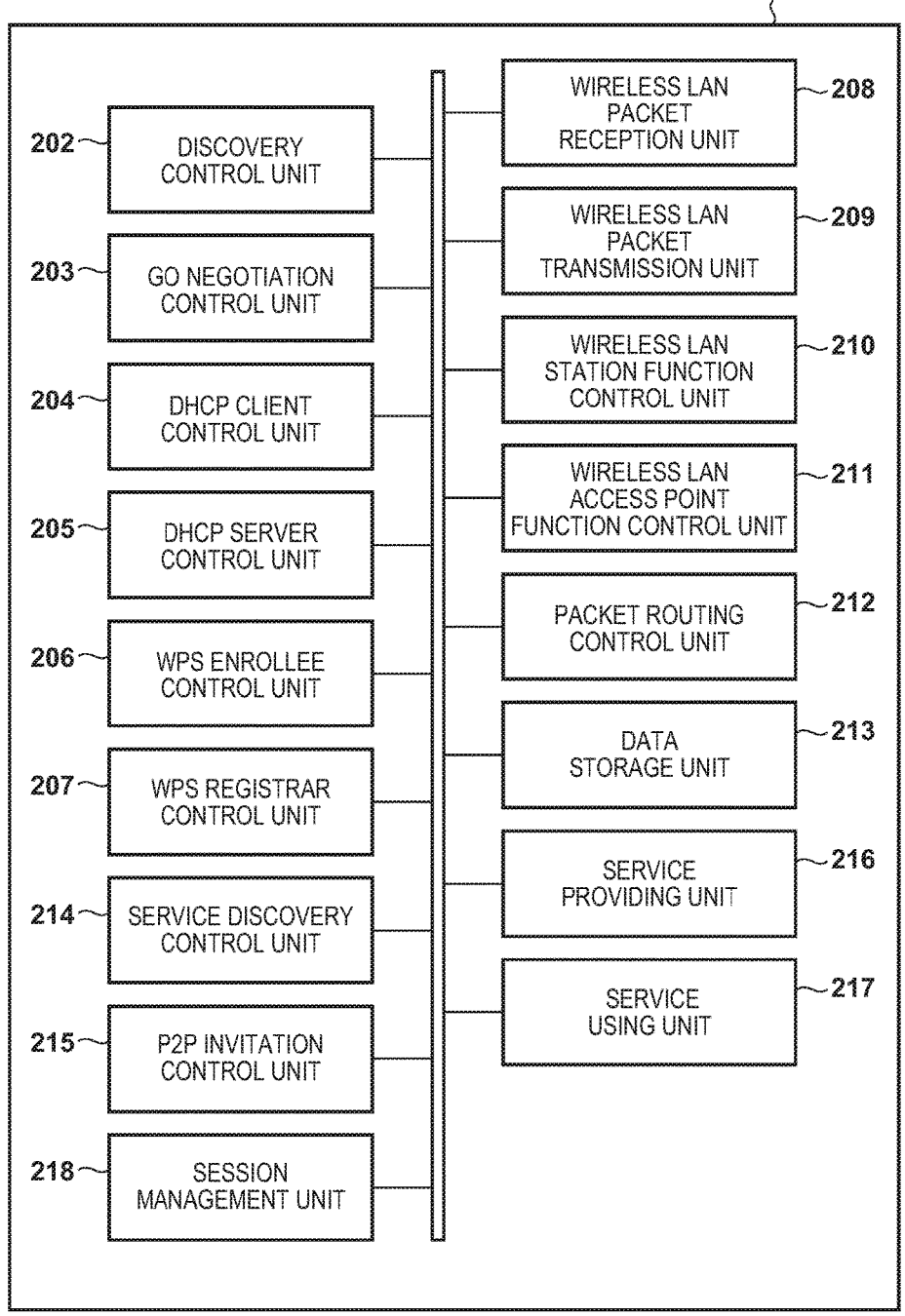
FIG. 2 is a block diagram showing a software configuration related to a communication function of the digital camera according to the embodiments.

FIG. 2 is a block diagram showing an example of the functional configuration of a functional block 201 that realizes a communication control function of this embodiment and is constituted by software as an example. The communication control function of the functional block 201 is realized by hardware and software of the digital camera 100.

A discovery control unit 202 performs device discovery processing by searching for an external device to serve as a communication partner. In addition, a GO negotiation control unit 203 performs GO Negotiation processing that is based on a Wi-Fi Direct protocol specification, and determines whether the digital camera 100 or the external device will serve the role of a wireless LAN access point (or a wireless LAN station). Note that in Wi-Fi Direct, a communication apparatus that provides a wireless LAN access point function is referred to as a P2P group owner (hereinafter, also referred to as a GO), and a communication apparatus that provides a wireless LAN station function is referred to as a P2P client (hereinafter, also referred to as a CL). In the case where the digital camera 100 operates as a GO or a wireless LAN access point, a wireless LAN access point function control unit 211 to be described later is started. On the other hand, in the case where the digital camera 100 operates as a CL or a wireless LAN station, a wireless LAN station function control unit 210 to be described later is started. A protocol related to this GO Negotiation processing is stipulated by the Wi-Fi Direct specification, and thus detailed description thereof is omitted. In Wi-Fi Direct, a network formed by a GO is called a P2P group. In this embodiment as well, a network may be called a P2P group, and description will be given assuming that these have the same meaning. Note that a P2P group owner (GO), a P2P client (CL) and communication apparatuses whose role has not been determined are collectively called P2P devices.

A DHCP client control unit 204 provides the functions of a DHCP client, and is started in the case where in the determination by the GO negotiation control unit 203, the role of the digital camera 100 is to serve as a wireless LAN station. Also, a DHCP server control unit 205 provides the functions of a DHCP server, and is started in the case where in the determination by the GO negotiation control unit 203, the role of the digital camera 100 is to serve as a wireless LAN access point.

A WPS enrollee control unit 206 receives a communication parameter required for wireless LAN communication, from another WPS registrar apparatus. Similarly to the DHCP client control unit 204, the WPS enrollee control unit 206 operates in the case where the role of the digital camera 100 is to serve as a wireless LAN station. A WPS registrar control unit 207 provides a communication parameter required for wireless LAN communication to another WPS enrollee apparatus. Similarly to the DHCP server control unit 205, the WPS registrar control unit 207 operates in the case where the role of the digital camera 100 is a wireless LAN access point. Note that the communication parameter provided by a WPS registrar is a parameter such as an SSID serving as a network identifier, an encryption key, an encryption system, an authentication key or an authentication system.

A wireless LAN packet reception unit 208 and a wireless LAN packet transmission unit 209 execute transmission/reception of all the packets including the communication protocol in the upper layers. The wireless LAN station function control unit 210 executes authentication processing, encryption processing and the like for the case where the digital camera 100 operates as a wireless LAN station, and participates in a wireless network formed by an apparatus that operates as a wireless LAN access point.

The wireless LAN access point function control unit 211 forms a wireless network in the case where the digital camera 100 operates as a wireless LAN access point function, and executes authentication processing, encryption processing, processing for managing the external device and the like. One of the wireless LAN station function control unit 210 and the wireless LAN access point function control unit 211 can operate, or both can operate at the same time.

When the wireless LAN access point function control unit 211 is operating, a packet routing control unit 212 bridges and routes communication packets.

A data storage unit 213 stores software programs, wireless LAN parameters and various tables such as a DHCP address table and an ARP table.

A service discovery control unit 214 realizes a service discovery function specific to Wi-Fi Direct. The service discovery control unit 214 obtains the information of a function that can be executed by an external device (namely, service information) by transmitting/receiving an action frame, which is a portion of management frames stipulated by IEEE 802.11u. Specifically, the service discovery control unit 214 transmits an SD Query as a control signal, and receives an SD Response as a response thereto. Alternatively, the service discovery control unit 214 receives an SD Query from the external device, and as a response thereto, transmits an SD Response. The SD Response includes information indicating the type of the service, and the type of the service provided by the apparatus that transmitted this response, such as a file transfer service, a print service or a moving image streaming service, is indicated.

A P2P invitation control unit 215 controls an Invitation function stipulated by the Wi-Fi Direct standard. This Invitation function is stipulated by the Wi-Fi Direct specification and thus description thereof is omitted, but this Invitation function is a function of a GO or a CL prompting a P2P device whose role has not been determined to connect as a P2P client.

A service providing unit 216 provides a file transfer service of the application layer. The application layer refers to a service providing layer among upper layers, namely, the fifth layer and higher in the OSI reference model. In the file transfer service, processing for transmitting/receiving various requests and responses and processing for transmitting/receiving transfer files are performed using a HTTP protocol.

A service using unit 217 uses a service provided by the file transfer service providing unit of the application layer of the external device.

A session management unit 218 manages logical connections in a file transfer service. In the case of using a file transfer service, a session generation request as a control signal that includes information of a file to be transferred (transfer file information) is transmitted to the external device, and a response to the request is received. In the case of providing a file transfer service, transfer file information is received, it is determined based on the content of this transfer file information whether or not session generation is possible, and a response is given. The transfer file information is information constituted by the number of files to be transferred, a total size and file names, for example. In the case where it is determined that session generation is possible, the session management unit 218 executes connection processing in the wireless layer. Note that exchange of information regarding session management is performed as transmission/reception of so-called control information for transferring a file, and is performed using a public action frame, which is a portion of management frames stipulated by IEEE 802.11, for example.

Note that all the functional blocks shown in FIG. 2 are not limited to functional blocks provided by software, and at least some of the functional blocks may be provided by hardware. Moreover, a configuration may be adopted in which the functional blocks are correlated to each other and a plurality of functional blocks constitute one functional block, or any one of the functional blocks is further divided into blocks for performing a plurality of functions. Furthermore, the file transfer service in the application layer is realized by an apparatus that provides the service and an apparatus that uses the service. In an example in this embodiment, an apparatus that uses a service is the digital camera 100, but an apparatus that provides a service may be other devices described above.

Figure 3:
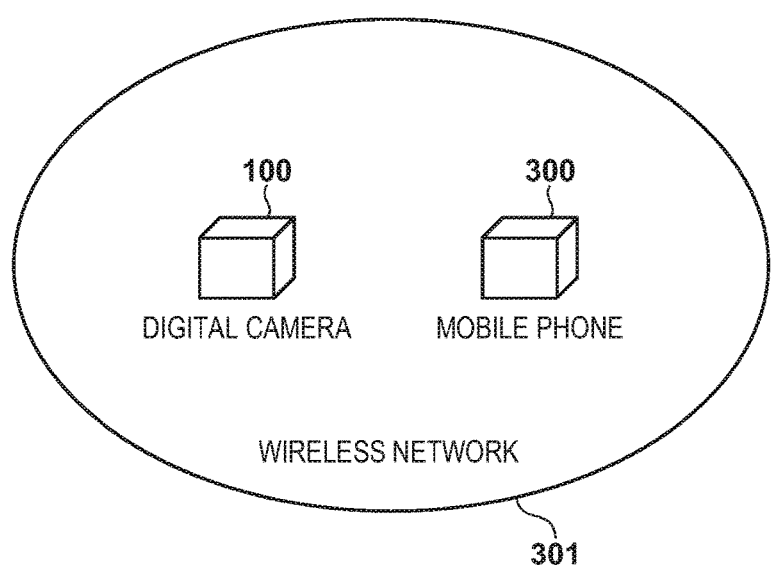
FIG. 3 is a schematic diagram showing an example of a network configuration according to the embodiments.

FIG. 3 shows an example of a wireless network 301 formed by the digital camera 100 and a mobile phone 300 that is an external device. Both the apparatuses have hardware and software (for example, hardware and software shown in FIG. 1) for realizing a communication control function of the functional block 201 described with reference to FIG. 2. The digital camera 100 and the mobile phone 300 participate in the formed wireless network 301, and establish wireless communication conforming to the IEEE 802.11 series of standards, for example.

Operation Sequence Related to Moving Image Transfer Processing

Figure 4:
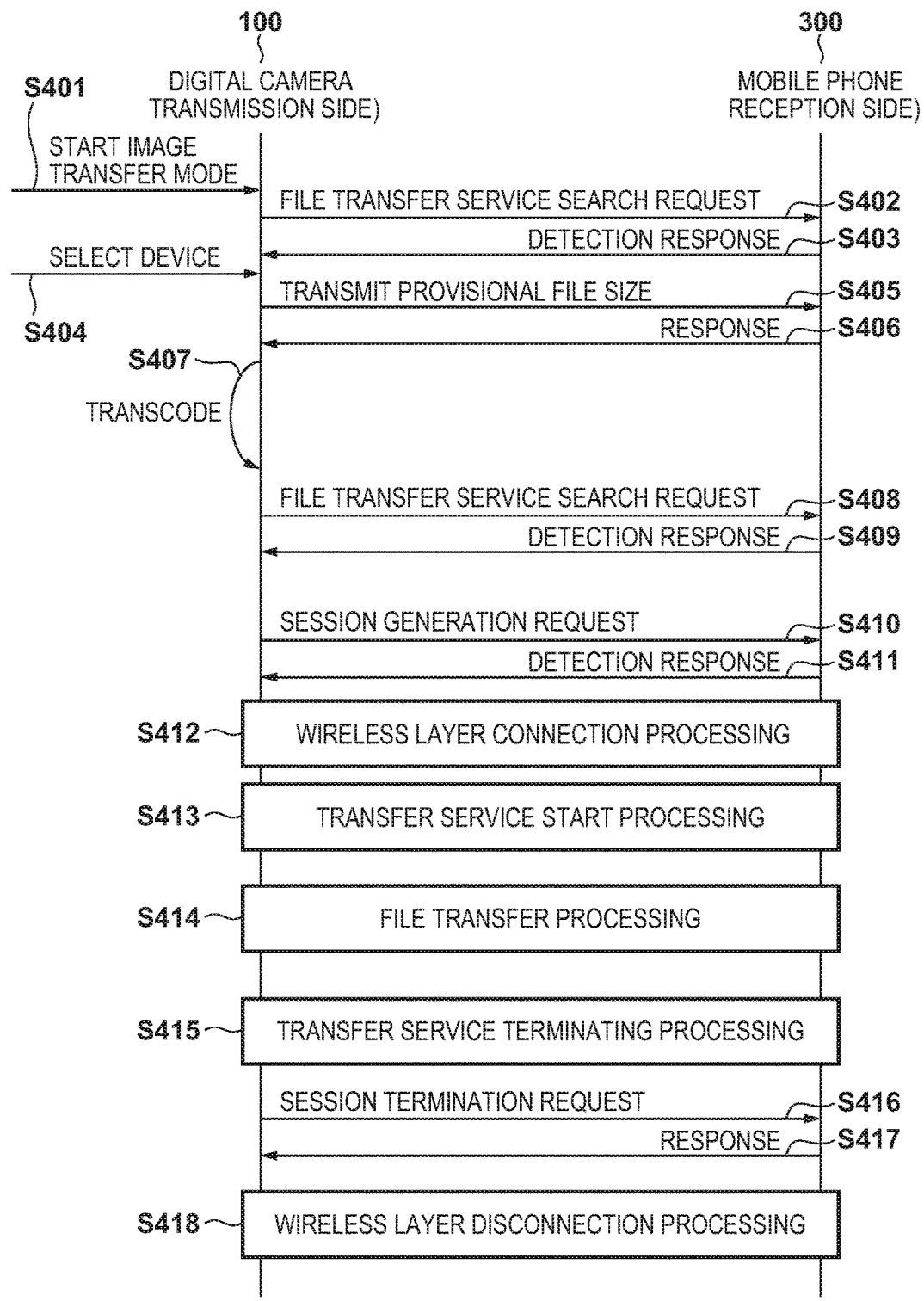
FIG. 4 is a schematic diagram showing an operation sequence between an external device and a digital camera according to a first embodiment.

Next, an operation sequence between apparatuses in the case where the digital camera 100 converts a moving image file stored in the storage unit 103 and transfers the converted moving image to the mobile phone 300 that is a transfer destination will be described with reference to FIG. 4. Note that in the example in FIG. 4, the digital camera 100 operates as a communication apparatus on a transmission side that uses a file transfer service, and the mobile phone 300 operates as a communication apparatus on a reception side that provides the file transfer service.

In step S401, the digital camera 100 receives an image transfer mode start instruction by a user operation via the operation unit 109. The user operation corresponding to the image transfer mode start instruction may be various operations for operating the digital camera 100, and, for example, an operation for starting viewing of shot image data and moving image data may be an image transfer mode start instruction.

In step S402, the digital camera 100 transmits a request signal for searching for a communication apparatus that provides a file transfer service (a file transfer service search request). Also, the digital camera 100 receives a user operation for selecting a file to be transferred, in parallel with the processing of step S402. Note that the user operation for selecting a file will be described later with reference to FIG. 6A. Note that transmission/reception of control signals such as information regarding a file transfer service search request and a session generation request is performed at a specific frequency band (also referred to as a channel) determined for the communication apparatuses, using an action frame that is a portion of the above-described management frames.

In step S403, the mobile phone 300 transmits, to the digital camera 100, a response signal (detection response) to the request signal transmitted in step S402. In step S404, the digital camera 100 that received the detection response then accepts, via the operation unit 109, a device selection instruction for selecting the mobile phone 300 as a connection destination from among a plurality of devices.

In step S405, the digital camera 100 transmits, to the mobile phone 300, a provisional file size after transcoding of the moving image file that is to be transmitted (that is, a provisional data size of the moving image file). Transcoding processing on a moving image file requires a predetermined processing time, and thus in this embodiment, before performing transcoding processing, the provisional file size is predicted and the prediction result is transmitted. With such configuration, without waiting for determination of the file size after transcoding processing is performed, whether or not the receiving apparatus can accept the data amount of the moving image file to be transmitted can be checked in a short time (at an early stage) after a moving image transfer mode has started. For example, the prediction of a provisional file size is performed using the file size and a file format attribute (e.g., a bit rate). For example, in the case where a moving image file having a file size of 100 MB and a bit rate of 32 Mbps is converted to 8 Mbps, it is envisioned that the file size will be approximately ¼. In this case, the digital camera 100 calculates a predicted file size after transcoding from the bit rate ratio, and transmits the predicted file size to the mobile phone 300. For example, in the above-described example, the predicted file size after transcoding is transmitted as 25 MB to the mobile phone 300. Note that various methods are conceivable as algorithms for such prediction. For example, besides the above-described bit rate ratio, a table in which compression formats before and after transcoding and the amounts of change in file size are associated, and the like may be held in the storage unit 103.

Note that the digital camera 100 can determine a data format (also referred to as a file format) after transcoding by various methods. For example, a configuration may be adopted in which a data format that can be processed by the mobile phone 300 is included in the detection response received in step S403, and the digital camera 100 determines a data format after transcoding based on the data format indicated in the detection response received from the mobile phone 300. Alternatively, a configuration may be adopted in which the digital camera 100 holds, in the storage unit 103, data formats after transcoding in association with predetermined data formats in advance, and determines a format into which the data is transcoded in accordance with the data format of a selected file. Moreover, a data format after transcoding that was set in advance by the user via a setting menu included in the operation unit 109 or the like may be used.

In step S406, the mobile phone 300 that received a notification of the provisional file size determines that the file to be transmitted from the digital camera 100 has a receivable size. In the case where it is determined that the file can be received, the mobile phone 300 transmits, to the digital camera 100, a response signal (success response) indicating that the notified file size can be received.

In step S407, the digital camera 100 that has received the success response from the mobile phone 300, using the control unit 102, sequentially reads out, from the storage unit 103, the moving image file to be transmitted, starts transcoding processing, and saves the data after conversion in the storage unit 103.

In step S408, similarly to steps S402 and S403, the digital camera 100 transmits a request signal for searching for a file transfer service in order to detect the mobile phone 300, after the transcoding processing ends, and receives a response signal to the request signal in step S409.

In step S410, the digital camera 100 transmits a request signal (session generation request) for generating a session to which transfer file information indicating the information of the file to be transferred is added, in order to establish connection with the mobile phone 300 for executing a file transfer service. By transmitting the transfer file information before the digital camera 100 performs processing for wireless LAN connection with the mobile phone 300, the mobile phone 300 can recognize in advance what type of file is to be transferred. The information regarding the file that is actually to be transferred and has undergone transcoding is added to the transfer file information of the session generation request. For example, the information regarding the file includes "number of files: 1, total size: 20 MB, filename: TRS_0001.MP4". For example, the filename is not the filename of the moving image file to be transcoded, but the filename of the moving image file generated by the transcoding and is unique. A number that increases every time transcoding is performed, or the date and time when transmission is performed may further be added to the filename.

In step S411, the mobile phone 300 transmits, to the digital camera 100, a response signal (success response) to the session generation request signal.

In step S412, the digital camera 100 carries out processing for wireless layer connection with the mobile phone 300. In this embodiment, the wireless layer connection processing is connection processing conforming to the Wi-Fi Direct specification, for example. Specifically, one of the digital camera 100 and the mobile phone 300 becomes a P2P group owner (GO) and the other becomes a P2P client (CL). The CL forms a network by participating in the wireless network constructed by the GO. Note that a device that participates in a network is not limited to a CL, and at the time when a wireless network is constructed, the GO may be the device that participates in the network.

In step S413, after wireless layer connection is established (namely, while participating in the network), the digital camera 100 carries out predetermined file transfer service start processing. Specifically, processing for setting an IP address by using DHCP, processing for obtaining, from the mobile phone 300, detailed information required for HTTP transfer in the file transfer service are performed.

In step S414, the digital camera 100 transmits the moving image file to the mobile phone 300 based on the transfer file information transmitted in step S410. Furthermore, in step S415, the digital camera 100 performs predetermined file transfer service termination processing. Specifically, processing for deleting information generated in the transfer service start processing of step S413 and the moving image file after being transcoded or processing for cancelling the settings is performed.

In step S416, the digital camera 100 transmits a request signal (session termination request) for terminating logical connection of the file transfer service with the mobile phone 300. In step S417, the mobile phone 300 that received the session termination request transmits a success response to the digital camera 100.

In step S418, the digital camera 100 performs processing for disconnecting the wireless layer connection with the mobile phone 300. In this embodiment, disconnection processing in the wireless layer is disconnection processing conforming to the Wi-Fi Direct specification described above, for example. The digital camera 100 then ends the series of sequences for transferring the converted moving images.

Note that in this embodiment, the provisional file size after transcoding that is transmitted in step S405 is determined based on the file size and bit rate. However, in the case where the compression rate is lower than a normal compression rate, there is a possibility that the data of the moving images exceeds the provisional file size obtained in this manner. Therefore, the value of the compression rate may be set so as to not exceed the provisional file size by using a predetermined coefficient. Similarly, regarding the provisional file size that is transmitted in step S405, in addition to the above-described determined size, various conditions may be taken into consideration, because the moving images actually need to be saved in the digital camera 100 and the mobile phone 300. For example, the case where a new folder is created, the case where the cluster size of the file is exceeded and the like can be taken into consideration. In such cases, the provisional file size is rounded up to the cluster size, and the increase in cluster size in the case of further adding one file is added to the provisional file size.

Note that an example was described in which a moving image file after being transcoded is transmitted, but in the case of transmitting an image file and a moving image file without performing transcoding, a portion of the steps, namely, from step S405 to step S411 can be omitted.

Series of Operations Related to Data Transfer Processing

Figure 5:
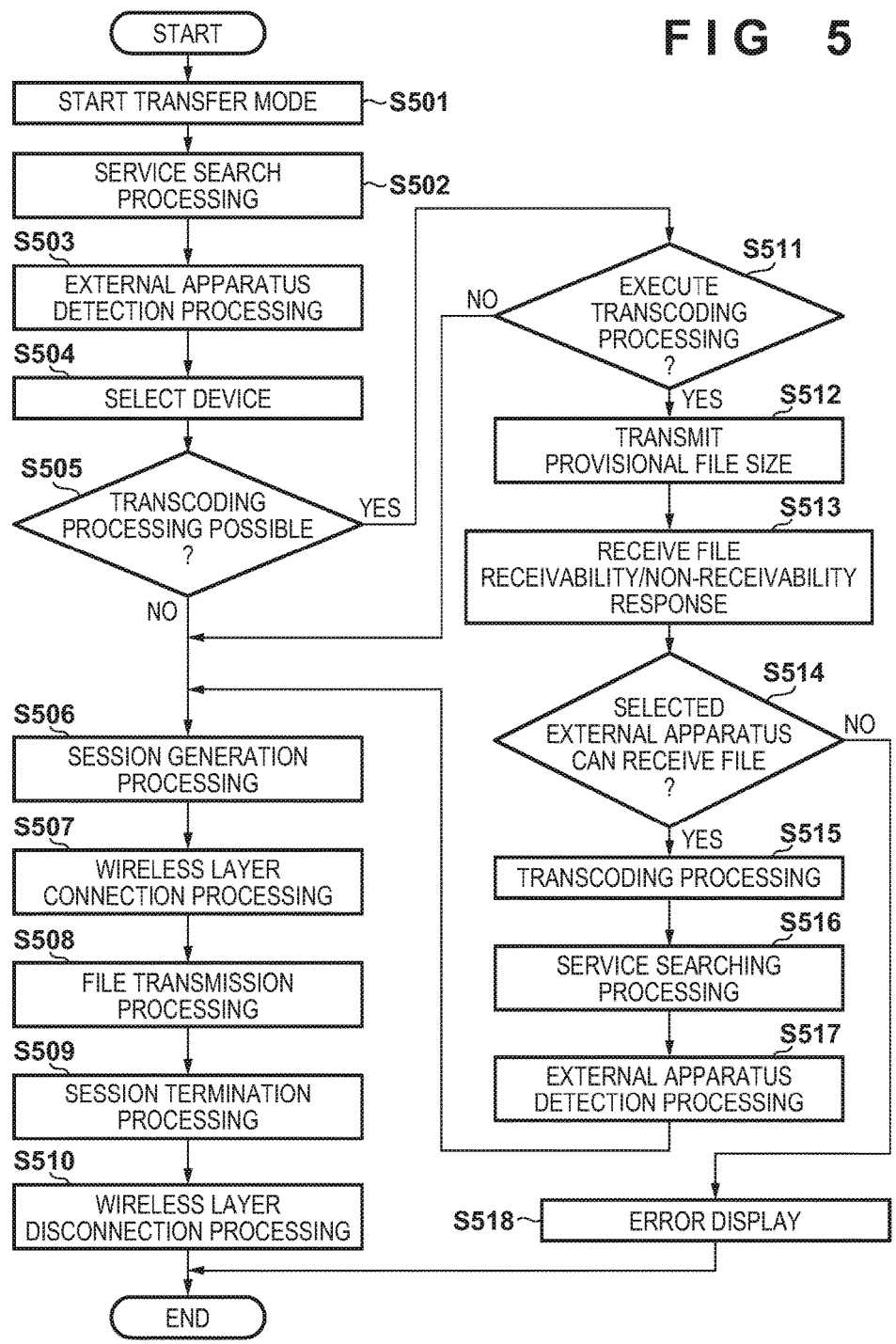
FIG. 5 is a flowchart showing a series of operations of data transfer processing according to the first embodiment.

Next, a series of operations related to data transfer processing of the digital camera 100, in which a moving image file stored in the storage unit 103 is transmitted to the mobile phone 300 using a file transfer service, will be described with reference to FIG. 5. Note that in the steps shown in FIG. 5, each constituent element is controlled by expanding a program stored in the ROM included in the storage unit 103 in the RAM included in the storage unit 103, and the control unit 102 executing the program.

In step S501, upon receiving an image transfer mode start instruction for a moving image displayed on the display unit 105 via the operation unit 109, the control unit 102 transmits a file transfer service search request in step S502. Also, the control unit 102 receives, via the operation unit 109, a user operation for selecting a file to be transferred, and specifies the file to be transferred, in parallel with the processing of step S502. The user operation for specifying a file to be transferred will be described later with reference to FIG. 6A.

In step S503, the control unit 102 receives a detection response to the file transfer service search request via the antenna 108, and performs processing for detecting an external device that can provide a service, based on the detection response. More specifically, the control unit 102 specifies the external device that transmitted the detection response, for example, using an identifier of the external device such as a device ID, and displays information that can be identified by the user (e.g., a device name) on the display unit 105.

In step S504, in accordance with the user selecting, via the operation unit 109, the identifiable information displayed in step S503, the control unit 102 identifies the selected external device (for example, the mobile phone 300).

In step S505, the control unit 102 determines whether or not transcoding processing can be performed on the moving image file selected to be transmitted to the mobile phone 300. Specifically, the control unit 102 determines whether or not transcoding processing is possible, based on criteria such as whether or not the bit rate of the moving image file targeted for transcoding processing is in a range of predetermined threshold values, whether or not the moving image was shot by the digital camera 100, and the like. In the case where it is determined that transcoding processing is possible, the control unit 102 advances the procedure to step S511. On the other hand, in the case where it is determined that transcoding processing is not possible, the procedure is advanced to step S506 in order to perform session generation processing without performing transcoding.

Next, a case will be described in which the control unit 102 determines in step S505 that transcoding processing is possible. In step S511, the control unit 102 determines whether or not to perform transcoding processing on the selected moving image file. Specifically, a user operation indicating whether or not transcoding processing is to be performed on the moving image file to be transmitted is received via the operation unit 109. Note that the user operation will be described later with reference to FIG. 6B. In the case where the received user operation indicates that transcoding is not to be performed, the control unit 102 advances the procedure to step S506, and in the case where the received user operation indicates that transcoding processing is to be performed, advances the procedure to step S512.

In step S512, the control unit 102 transmits, to the mobile phone 300, a provisional file size envisioned in the case where transcoding processing is executed. At this time, the provisional file size that is transmitted is determined in step S405 by the above-described method, for example.

In step S513, the control unit 102 receives, from the mobile phone 300, a response (receivability/non-receivability response) indicating whether or not the file to be transferred can be received. In step S514, the control unit 102 then determines whether or not the file to be transferred can be received by the selected external device (the mobile phone 300). Specifically, in the case where the received receivability/non-receivability response indicates that the file can be received, the control unit 102 determines that the mobile phone 300 can receive the moving image data that has undergone transcoding processing. On the other hand, in the case where the receivability/non-receivability response indicates that the file cannot be received, the control unit 102 determines that the mobile phone 300 cannot receive the moving image data. In the case where it is determined that the mobile phone 300 cannot receive the moving image file, the control unit 102 advances the procedure to step S518, and causes the display unit 105 to display error indication display. In step S518, upon receiving a predetermined user operation after the error display, the control unit 102 deletes the error display, and ends this series of processing without performing processing for connecting to the external device. On the other hand, in the case where it is determined in step S514 that the mobile phone 300 can receive the file, the procedure is advanced to step S515.

In step S515, the control unit 102 causes the data conversion unit 106 to perform transcoding processing. After that, when a moving image file that has undergone transcoding processing is generated, the control unit 102 obtains this moving image.

In step S516, the control unit 102 performs service searching processing similarly to step S502, and in step S517, further performs external device detection processing similarly to step S503. Here, the transcoding processing requires a certain amount of time, and thus whether or not an external device is detected is also determined immediately before connection processing is performed. With such configuration, in the case where the state changes to a state in which an external device cannot be detected, it is possible to reduce wasteful processing that fails after starting connection processing. Note that in the example in this embodiment, the control unit 102 advances the procedure to step S506 assuming that the external device selected in step S504 (namely, the mobile phone 300) is present without any change, and the external device is detected.

Next, processing in the case where it is determined in step S505 that transcoding processing is not possible and the case where it is determined in step S514 that the selected external device can receive the file will be described.

In step S506, the control unit 102 executes session generation processing of the file transfer service. Specifically, the control unit 102 transmits, to the mobile phone 300, a session generation request to which transfer file information is added, and after that, receives a detection response from the mobile phone 300.

In step S507, the control unit 102 performs processing for wireless layer connection conforming to the Wi-Fi Direct specification, and further executes IP address setting processing by using DHCP and processing for acquiring detailed information necessary for HTTP transfer in the file transfer service.

In step S508, the control unit 102 transmits the moving image file related to data transfer to the mobile phone 300 based on the transfer file information transmitted in step S506. When transmission of the moving image file to the mobile phone 300 is complete, the control unit 102 performs the file transfer service termination processing described above with reference to FIG. 4.

In step S509, the control unit 102 performs session termination processing. Specifically, the control unit 102 transmits a session termination request to the mobile phone 300, and receives, from the mobile phone 300, a response signal as a response to the session termination request.

In step S510, when the above-described session termination processing is completed, the control unit 102 performs wireless layer disconnection processing. Specifically, the control unit 102 performs wireless layer disconnection processing conforming to the Wi-Fi Direct specification. When the wireless layer disconnection processing ends, the control unit 102 ends the series of operations related to data transfer processing.

Display Example of Display Unit 105 Related to Moving Image Transfer

Next, an example of a screen displayed on the display unit 105 by the control unit 102 when using a file transfer service will be described with reference to FIGS. 6A and 6B. FIG. 6A shows a screen example when specifying a moving image file to be transferred. In the example in FIG. 6A, for example, a moving image 601 is displayed at the center of the screen, and is displayed along with an icon used by the user for giving a reproduction instruction to reproduce this moving image. Note that this moving image 601 may be one moving image file selected from a plurality of moving image files by the user, for example. Furthermore, a transmission button 602 for transmitting the file of the moving image 601 to the external device is displayed under the moving image 601, for example, and when the transmission button 602 is pressed, the displayed moving image is specified as a moving image file to be transferred.

Figure 6B:
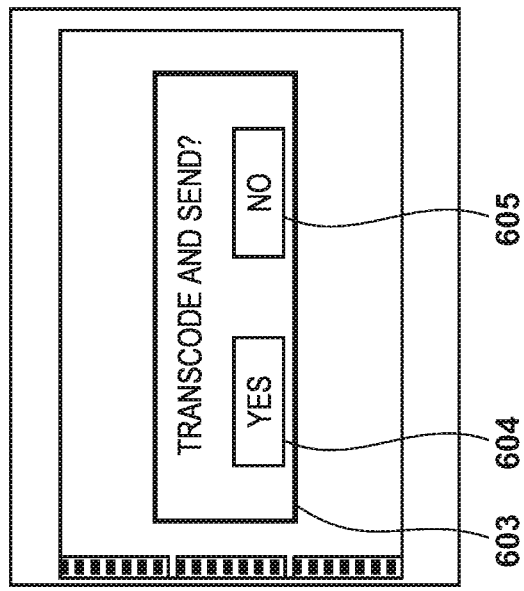
FIGS. 6A and 6B are diagrams showing an example of a GUI screen of the digital camera according to the first embodiment.
Figure 6A:
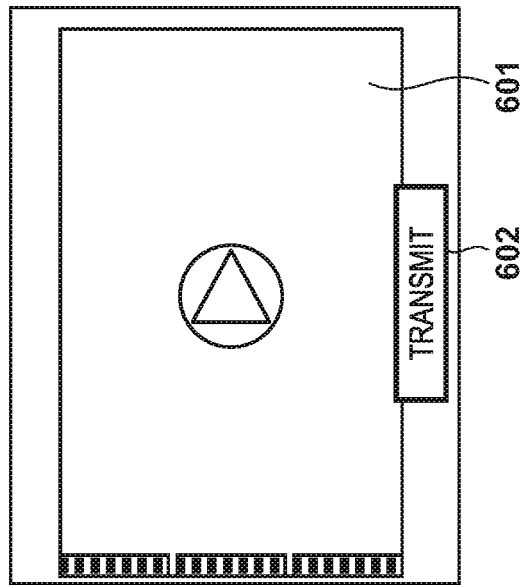

FIG. 6B shows a screen example for receiving a user operation for selecting whether or not to perform transcoding processing of the above-described step S511. After determining that the moving image 601 can be transcoded, the control unit 102 displays a dialog 603 on the display unit 105. A button 604 for transcoding and transmitting a moving image file, and a button 605 for transmitting a moving image file without performing transcoding are also displayed. After that, when any user operation is input, the control unit 102 transmits the moving image in accordance with the user operation.

Note that in the above-described embodiment, as an example, a configuration was described in which transcoding processing is performed on a moving image file to be transmitted. However, also in the case where the file to be transmitted is a still image, and resize processing and filter processing are performed on the file, the above-described series of processing can be applied. In this case, it is sufficient that image processing is performed on the still image, instead of moving image file transcoding processing.

Moreover, in this embodiment, an example was described in which one moving image file is transmitted, but a plurality of files may be targeted, and a plurality of image files that include a plurality of moving image files and still image files may be targeted. In the case where among files to be transmitted, a plurality of files require transcoding processing, it is sufficient to obtain a provisional file size corresponding to processing for transcoding each file, and to transmit the total of the sizes of those files in the provisional file size transmission in step S405. With such configuration, compared with the case where the user transmits still image files and moving image files individually one by one, a plurality of still images and moving images can be easily transmitted with a small number of operations.

Furthermore, in this embodiment, description was given assuming that transcoding processing is performed by the data conversion unit 106, but a configuration may be adopted in which the digital camera 100 causes an external device to execute transcoding processing, obtains a file that has undergone transcoding, and transfers the file to the mobile phone 300. With such a configuration, it is possible to increase the number of variations of transcoding processing and to distribute the processing load of the digital camera 100.

As described above, in this embodiment, control information is transmitted/received to/from an external device before performing connection with the external device, and it is determined whether or not the file after being transcoded can be received. With such a configuration, in the case of performing transcoding processing and transferring the data to the external device, wasteful communication processing can be avoided. In other words, it becomes possible to avoid a situation in which the external device cannot receive the moving image file, after performing transcoding processing on the moving image file and performing connection processing. Moreover, transcoding processing is performed before wireless communication connection processing. With such a configuration, it is possible to suppress the increase in processing load due to simultaneous execution of transcoding processing and connection processing, and to assign more computation resources to other operations.

Moreover, before performing transcoding processing on a moving image file, a provisional file size is predicted, and is transmitted to an external device using control information. With such a configuration, it is possible to reduce wasteful execution of transcoding processing, and to determine, at an early stage of moving image transfer processing (i.e., in a short time), whether or not the external device can receive a moving image file that has undergone transcoding.

Second Embodiment

Next, a second embodiment will be described. In the second embodiment, processing in the case where an external device cannot be re-detected when transcoding processing on a moving image file is completed and the moving image file is transmitted to the external device will be described. The configuration of the digital camera according to this embodiment is the same as the configuration of the digital camera 100 shown in FIG. 1, and a series of operations of data transfer processing according to this embodiment is the same as the operations in the first embodiment except for a portion of steps related to external device detection processing from step S516 onward. Therefore, the same reference numerals are given to the same constituent elements, overlapping description is omitted, and the differences will be mainly described.

A series of operations of data transfer processing according to this embodiment will be described below with reference to FIG. 7. Note that in FIG. 7, regarding the processing of step S516 onward (service searching processing) in the first embodiment, the processing in the case where the selected external device (the mobile phone 300) cannot be detected again is described. Accordingly, the control unit 102 executes the processing of steps step S501 to step S516 in a similar manner to the first embodiment.

In step S701, the control unit 102 performs external device detection processing similarly to step S517. Specifically, the control unit 102 receives, via the antenna 108, a detection response to the file transfer service search request transmitted in step S516, and performs processing for detecting the external device that can provide the service, based on the detection response.

In step S702, the control unit 102 determines whether or not the external device selected in step S504 (namely, the mobile phone 300) could be detected. Specifically, the control unit 102 compares the identifier of the external device related to the received detection response (e.g., a device ID) and the identifier of the external device selected in step S504, and in the case where these identifiers match, determines that the selected external device could be detected. In the case where it is determined that the selected external device was detected, the control unit 102 advances the procedure to step S506, and in the case where it is not determined that the selected external device was detected, advances the procedure to step S703. In the case of advancing the procedure to step S506, the control unit 102 further performs the processing of step S506 onward described in the first embodiment and ends the series of operations related to data transfer processing.

In step S703, namely, in the case where the selected external device was not detected, the control unit 102 stands by for a predetermined time that is determined in advance. In step S704, the control unit 102 then determines whether or not to perform re-detection of the selected external device. Specifically, for example, the control unit 102 counts the number of times external device detection processing in step S701 is attempted, and if the number of times detection processing is performed is less than or equal to a predetermined threshold value, determines that re-detection is to be performed. Alternatively, a configuration may be adopted in which the control unit 102 displays, on the display unit 105, display for prompting a user operation indicating whether or not to perform re-detection, and determines whether or not to perform re-detection of the external device in accordance with the user operation that is input via the operation unit 109. In the case where it is determined that re-detection is to be performed, the control unit 102 returns the procedure to step S701 again in order to perform external device detection processing again. On the other hand, in the case where it is determined that re-detection is not to be performed, a state is entered in which an external device to which the file is to be transferred cannot be found, and thus transfer of the moving image file is canceled and the series of operations of data transfer processing ends. Note that in the case where the external device could not be detected in the first detection processing in step S701, the control unit 102 may display error display on the display unit 105, and repeat detection processing in parallel with this display. With such configuration, it is possible to continue external device detection without excessively increasing the user operation load.

Note that in the case of performing re-detection in step S704, the procedure is returned to step S701, but the procedure may be returned to step S513 so as to repeat transmission of the provisional file size again. With such configuration, in the case of connecting to the network again, the selected external device can receive a request signal and transmit a response signal.

Moreover, a configuration may be adopted in which the user can select whether or not to perform re-detection processing of steps S703 and S704, in the case where the external device was not detected in step S701.

As described above, according to this embodiment, in the case where the external device cannot detected after transcoding processing, processing for re-detecting the external device is repeated at a predetermined time interval. With such configuration, in the case where the external device that was detected once cannot be re-detected, it is possible to easily detect the external device and continue data transfer processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-187435, filed Sep. 24, 2015, which is hereby incorporated by reference herein in its entirety.

What is claimed is:

1. A digital camera capable of communicating with an external device via a wireless network, comprising:
    a discovery unit configured to perform discovery of a device that can provide a predetermined service;
    a transmission unit configured to transmit, to the external device, relevant information regarding data to be transmitted to the external device, wherein the external device is a mobile device that is discovered in the discovery performed by the discovery unit before connecting to a wireless network that is formed by the external device;
    a reception unit configured to receive, from the external device, a response to the relevant information transmitted by the transmission unit;
    a connection unit configured to connect to the wireless network, in a case where the response is received by the reception unit;
    a data communication unit configured to establish communication with the external device and transmit the data that is used in the predetermined service provided by the external device, after the connection unit has connected to the wireless network;
    a conversion unit configured to convert data; and
    a prediction unit configured to, before converting the data, predict the relevant information regarding the data to be converted by the conversion unit including a predicted file attribute after the conversion, wherein in a case of converting the data to be transmitted to the external device, the transmission unit transmits the relevant information regarding the data to be converted that was predicted as the relevant information by the prediction unit.

2. The apparatus according to claim 1, wherein after the relevant information regarding the data to be converted is transmitted as the relevant information, and the response is received by the reception unit, the data communication unit transmits data converted by the conversion unit to the external device.

3. The apparatus according to claim 1, wherein after the response is received by the reception unit, the conversion unit converts the data to be converted.

4. The apparatus according to claim 1, wherein in a case where the response is not received by the reception unit, the conversion unit does not convert the data to be converted.

5. The apparatus according to claim 1, wherein the response includes information indicating that data transmission to the external device is permitted.

6. The apparatus according to claim 1, wherein the relevant information regarding the data to be converted includes size information in a case where the data to be converted is converted by the conversion unit.

7. The apparatus according to claim 1, wherein the relevant information regarding the data to be converted includes data format information in a case where the data to be converted is converted by the conversion unit.

8. The apparatus according to claim 1, wherein after the data to be converted is converted by the conversion unit, the transmission unit transmits, to the external device, the relevant information regarding the data to be converted.

9. The apparatus according to claim 1,
wherein the wireless network is a network formed by an access point.

10. The apparatus according to claim 1,
wherein the connection unit connects to the wireless network by a wireless communication scheme that is based on Wi-Fi Direct.

11. The apparatus according to claim 1,
wherein the communication apparatus is capable of operating as an access point and forming the wireless network.

12. A control method of a digital camera capable of communicating with an external device via a wireless network, the method comprising:
performing discovery of a device that can provide a predetermined service;
transmitting, to the external device, relevant information regarding data to be transmitted to the external device, wherein the external device is a mobile device that is discovered by performing the discovery, before connecting to a wireless network that is formed by the external device;
receiving, from the external device, a response to the transmitted relevant information;
connecting to the wireless network, in a case where the response is received;
establishing communication with the external device and transmitting the data that is used in the predetermined service provided by the external device, after connecting to the wireless network; and
before converting the data, predicting the relevant information regarding data to be converted including a predicted file attribute after the conversion, wherein in a case of converting the data to be transmitted to the external device, the relevant information regarding the data to be converted that was predicted as the relevant information in the predicting is transmitted.

13. A non-transitory computer-readable storage medium storing a program for causing a computer to execute a control method of a digital camera capable of communicating with an external device via a wireless network, the program including codes for:
performing discovery of a device that can provide a predetermined service;
transmitting, to the external device, relevant information regarding data to be transmitted to the external device, wherein the external device is a mobile device that is discovered by performing the discovery, before connecting to a wireless network that is formed by the external device;
receiving, from the external device, a response to the transmitted relevant information;
connecting to the wireless network, in a case where the response is received;
establishing communication with the external device and transmitting the data that is used in the predetermined service provided by the external device, after connecting to the wireless network; and
before converting the data, predicting the relevant information regarding data to be converted including a predicted file attribute after the conversion, wherein in a case of converting the data to be transmitted to the external device, the relevant information regarding the data to be converted that was predicted as the relevant information in the predicting is transmitted.

* * * * *